Sept. 13, 1932. G. M. HAYES 1,877,459
MACHINE FOR USE IN DETERMINING THE LONGITUDE AND
LATITUDE AND DIRECTION OF FLIGHT OF AN OBSERVER
Filed April 24, 1929 8 Sheets-Sheet 4

INVENTOR.
George M. Hayes
BY
ATTORNEYS.

Sept. 13, 1932.    G. M. HAYES    1,877,459
MACHINE FOR USE IN DETERMINING THE LONGITUDE AND
LATITUDE AND DIRECTION OF FLIGHT OF AN OBSERVER
Filed April 24, 1929    8 Sheets-Sheet 7

INVENTOR.
George M. Hayes
BY
ATTORNEYS.

Patented Sept. 13, 1932

1,877,459

UNITED STATES PATENT OFFICE

GEORGE M. HAYES, OF NEW YORK, N. Y., ASSIGNOR OF ONE-HALF TO THOMAS P. CONLON, OF NEW YORK, N. Y.

MACHINE FOR USE IN DETERMINING THE LONGITUDE AND LATITUDE AND DIRECTION OF FLIGHT OF AN OBSERVER

Application filed April 24, 1929. Serial No. 357,761.

The present invention relates to machines or instruments suitable for use in rapidly moving aeroplanes or airships, or other vehicles where position both as to longitude and latitude must be quickly obtained at night especially, when landmarks cannot be observed, but it is apparent from the following description read in connection with the drawings and claims that with certain minor modifications the machine may be used in the day time with the sun as the heavenly body observed, and that when the stars are mentioned in the following description that the moon and the planets can be used as the objects observed as readily as the fixed stars.

The object of my invention is to provide a machine that will indicate the true zenith point of the observer at any instant with reference to the stars, compensating for uneven keel of the aeroplane as to true level in every direction within a wide variation. The machine shown in the accompanying drawings will do this within a variation of fifteen degrees approximately in any direction from true level, but it is apparent that this can very easily be increased, this fifteen degrees being taken as a practical limit for illustration.

Another object of this invention is to provide a machine that will indicate the true course of the observer in reference to the stars and allow him to compute and chart his drift due to winds and other causes, this drift being indicated to the observer by the variation during a period of time between the point among the stars at which his zenith point as indicated by the machine should have arrived and the point at which it actually does arrive.

As this is a new and novel invention and one that may not be so readily understood because of the fact that the terms used do not coincide with the usual methods of determining position, I believe that a few words as to the theory of the machine and the principals upon which it works will not be amiss before going on to a further description of the objects of this invention; therefore I say that the observer having determined his own zenith point in reference to two known stars, which may be easily determined from a chart, adjacent to this indicated zenith point, then the latitude of this point is fixed and determined. Now having an imaginary line drawn in the direction in which the machine is pointed between these stars his direction is then determined. After a short period of time has elapsed a new reading is taken and hence a second latitude will in the same way be determined in reference to these same stars. In both cases the longitude is also determined and fixed when the time of each observation is known. The position of the stars being charted however as they would look from the outside of the universe of stars in a line with the zenith point of the observer. Now if this chart is in the same scale as the scale plate in the machine, the stars on the chart will appear the same distance from the zenith point as they actually appear from the center of the scale plate when the eye of the observer is held at the proper distance therefrom.

A further object of this invention is to provide a machine or device that can be used by one unfamiliar with the formulas and calculations of navigation and to provide a device that will be practical and workable with charts of the stars alone as a reference.

A further object has been to provide a machine or instrument that could be used by the pilot of an aeroplane as the observer of his own position and to obviate the use of telescopes or lenses which would tire his eyes and prevent his constant attention to the control of his aeroplane.

With these and other objects in view my invention is shown in the accompanying drawings, and will be hereinafter fully described with reference thereto and finally pointed out in the claims.

In the accompanying drawings.

Similar reference characters indicate corresponding parts throughout the several figures of the drawings.

Referring to the drawings and more particularly to Figures 1, 2, 3, 4, and 5;

The mirror 1, carried by the frame 2, can move on two axes in its relation to the base 3. One of these axis X—X preserves the level of the frame 2 as the base may swing from side to side, and this is achieved in the machine through the double ball bearings shown at 4 and the three rollers at 5. The other axis on which the mirror turns in relation to the true level is shown as Y—Y and is obtained by the ball bearings shown at the ends of the trunnion shaft 6 supporting the mirror and to which the mirror is firmly attached by the cleats shown more clearly in Figure 1. The movement of the mirror about this latter axis Y—Y is controlled by the gearing to the plumb weight 7, which is in proportion as two is to one, that is to say that the plumb weight must move on its shaft 8 twice the angular distance that the mirror is moved, the idler gear 9 on its shaft 10 being used to give to the mirror and the plumb weight the same direction of rotation. The stabilizing gyroscope 11 is used to dampen the oscillations about both axes, namely X—X and Y—Y. The operation of the machine will not be affected by substituting other means for dampening these oscillations, or in some cases by dispensing with the gyroscope and using the plumb weight alone, or by employing a separate gyroscope for each axis, or by using the gyroscope alone without the plumb weight. The gyroscope 11 consists of a weighted wheel 12 attached to the armature shaft of a small electric motor 13, which is supplied with electric current to run it from an outside source, such as a storage battery or generator. Fastened to the shaft 14 which carries the gyroscope is a gear 15 in mesh with the idler gear 9 and of the same pitch diameter as the gear on the shaft carrying the plumb weight 7; so that the gyroscope will have the same direction of rotation and the same angular displacement as the plumb weight.

The trunnion 6 which carries the mirror is so shaped that the axis of this shaft lies in the same plane as the true reflecting surface of the mirror, and the line that this axis makes in crossing the plane of the true reflecting surface of the mirror is marked by a fine line cut through the reflecting metal of the mirror so as to allow a very fine marking of light to show on the surface of the mirror when it is viewed in the dark, the light being obtained from the housed electric lamp 20 supplied with electric current from an outside source such as a storage battery or generator. The axis of the mirror, marked by the fine line of light from underneath is shown in the drawings at 16, as though the slits 17 cut through the shaft 6 were also scratched for their full width through the silvered reflecting surface 21 of the mirror; they are thus illustrated so that these markings will be clearly distinguishable in Figures 5, 10, and 11. The center vertical slit 18 being the marking of the vertical optical center line of the mirror and the two vertical slits 19 towards the edges being used to obtain the focus for the eye of the observer so that when these latter slits are compared with proper markings on the scale plate 22, the observer can determine the proper distance and position for his eye, so that the stars when seen in relation to the other lines and markings on the scale plate can then be used as a scale to compare with the indicated zenith point, which is the intersection of the vertical and horizontal center lines of the mirror and of the scale plate, when the machine is properly set and adjusted. The lines on the scale plate can be marked thereon with luminous paint so that they can be seen in the dark. Other means of marking them can be used however such as white threads on the surface of the scale plate very dimly illuminated.

Luminous paint or white threads may be used for the markings on the mirror but the housed light underneath showing through lines in the reflecting surface is the best because they are then easily distinguishable from the lines on the scale plate. The scale plate can assume a great variety of forms and shapes in its design without affecting the operation of the machine. The design of the lines on the scale plate can be varied to suit the preference of the observer, polar co-ordinates are shown in the figures except in Figure 11 which shows rectangular co-ordinates.

Figure 1:
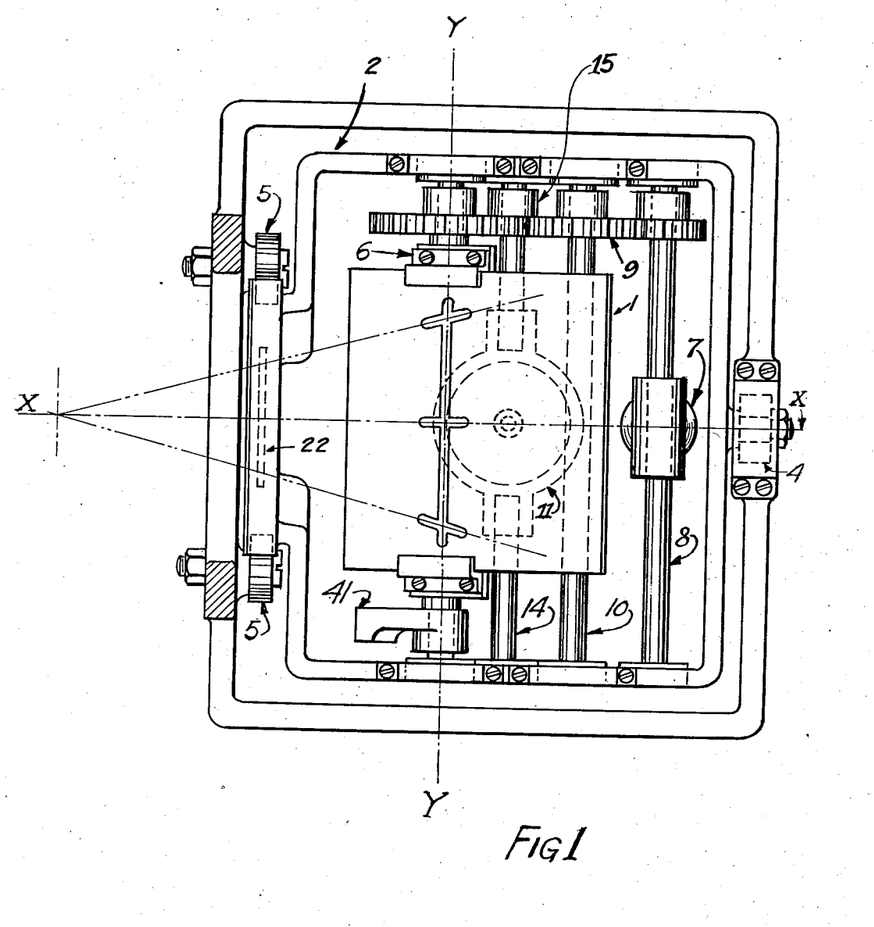
Figure 1 is a plan view of the machine.
Figure 2:
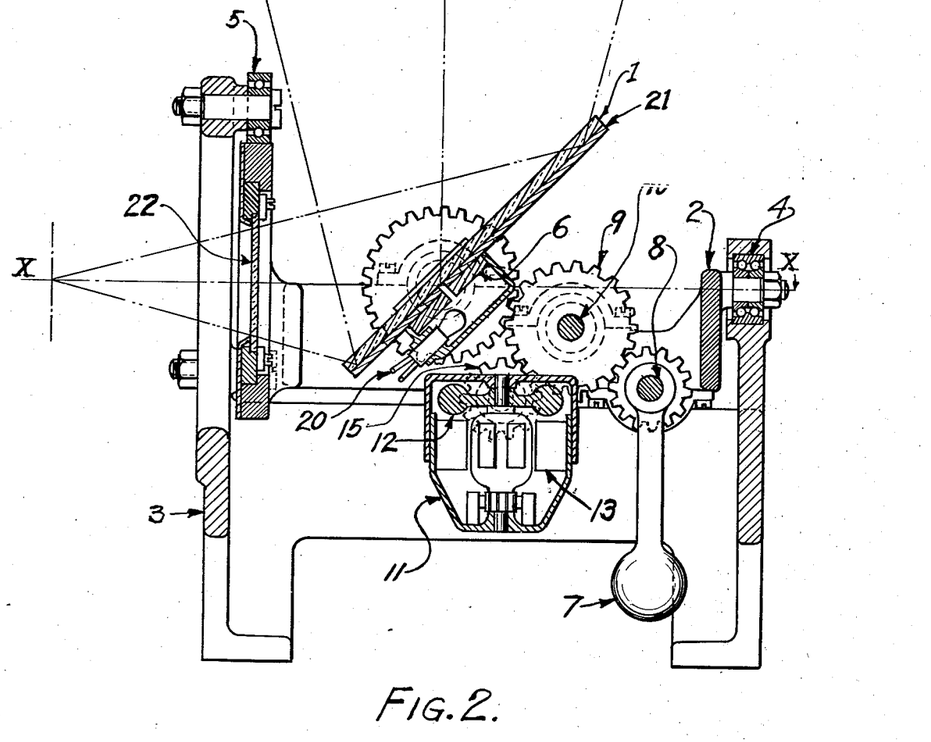
Figure 2 is a vertical sectional side elevation of the machine.
Figure 3:
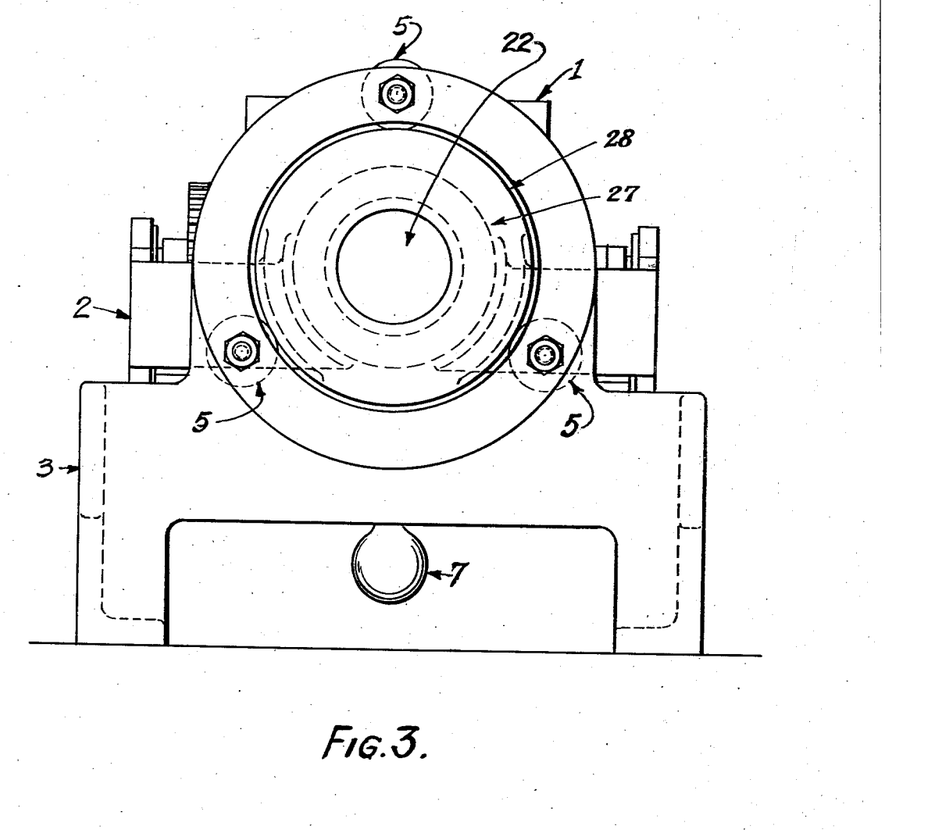
Figure 3 is a front elevation of the machine.
Figure 4:
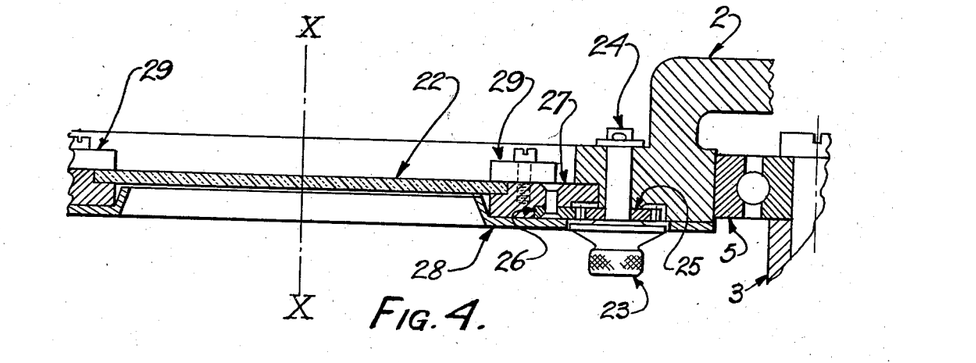
Figure 4 is an enlarged partial horizontal section of the front of the machine showing the details of construction, one of the rollers is brought up to the horizontal line.
Figure 5:
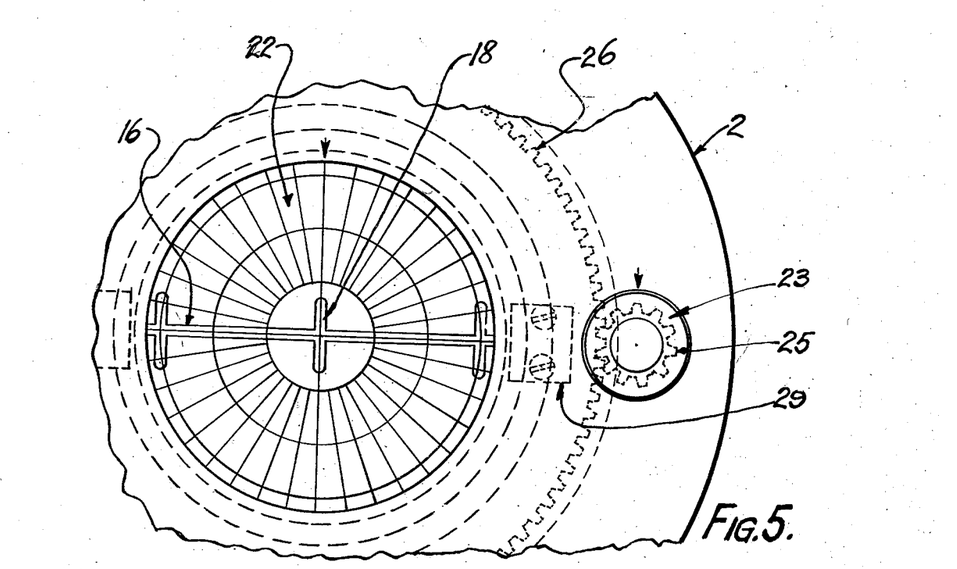
Figure 5 is an enlarged partial front elevation showing the lines on the scale plate (which is the front glass) and also the lines on the mirror as they would appear to an observer when his eye is in focus and held the proper distance from the scale plate.

The details of the scale plate to go with Figures 1, 2 and 3 is shown in Figures 4 and 5. This form of scale plate allows the observer to turn the lines of the co-ordinates so as to assist him in comparing his proposed course to the charts. This is accomplished by turning the knob 23. When the pinion 25 meshing with the ring gear 26 is turned by means of the shaft 24 to which the pinion and the knob 23 are affixed (they can be pressed onto the shaft) the disk 27 to which the ring gear is riveted, carrying the scale plate 22 held to the disk by the cleats 29, and held in position by the cover plate 28, is also rotated in the front part of the frame 2. This rotation however being independent of the general rotation of both the scale plate 22 and the mirror 1 in the bearings 5. The cover plate can be graduated for the scale plate and for the knob, the knob acting as a vernier, or simple reference marks such as arrow heads shown in the drawings may be used.

Figure 6:
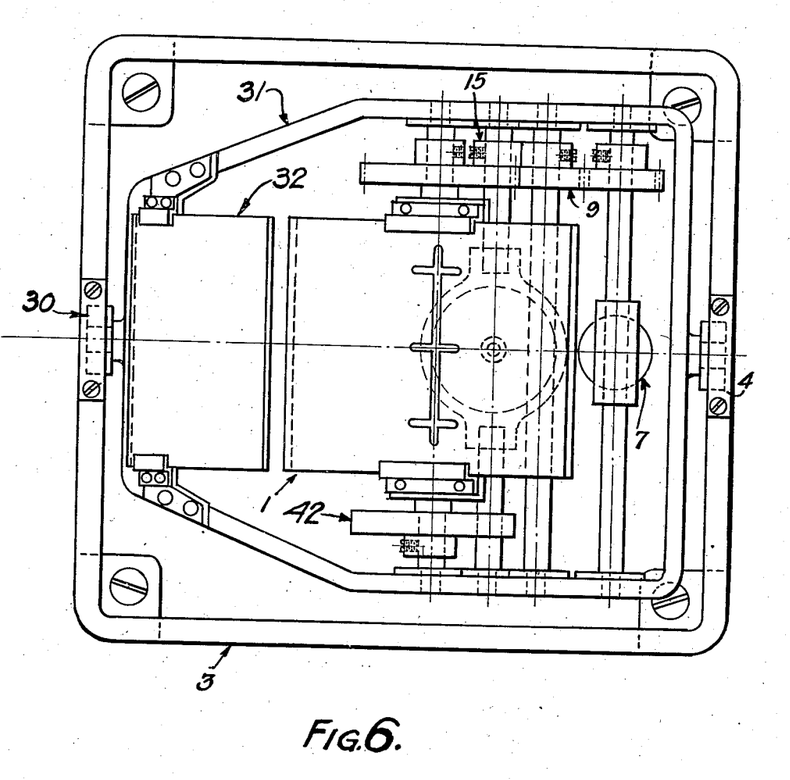
Figure 6 is a plan view of a slightly modified form of this invention.
Figure 7:
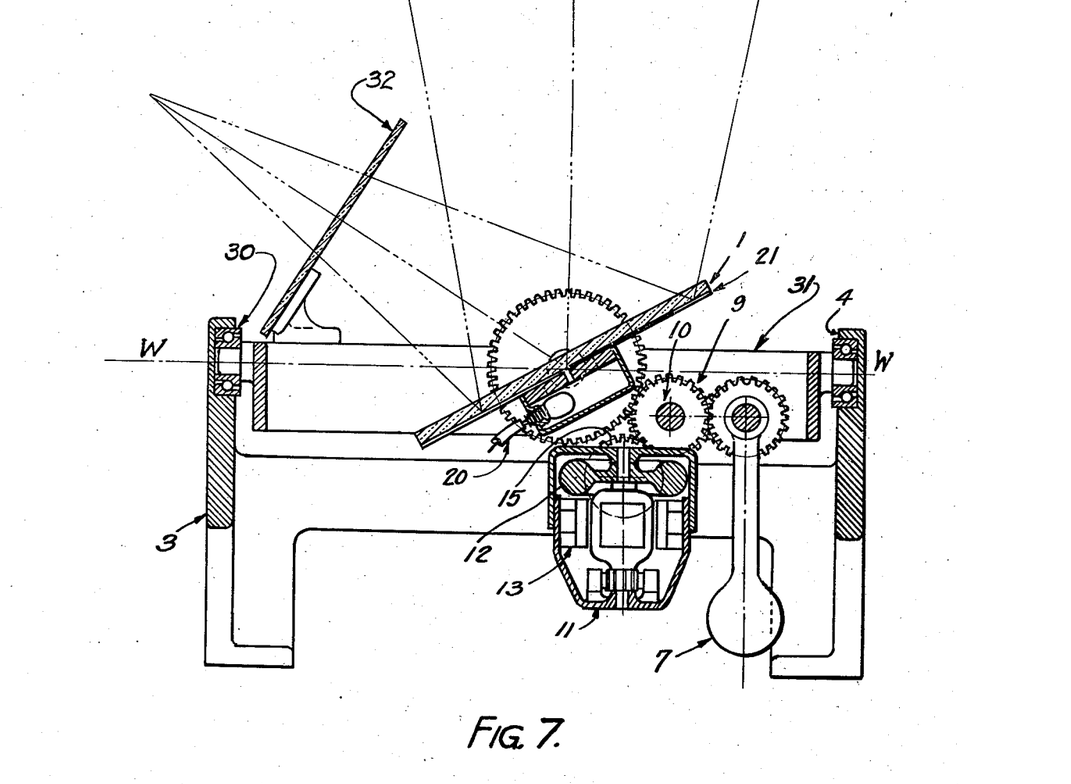
Figure 7 is a vertical sectional view of the side of this modified form.
Figure 8:
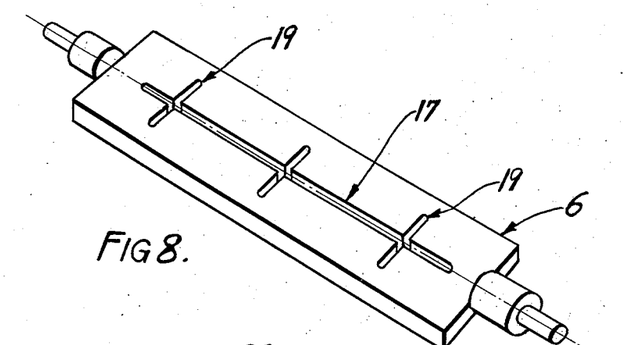
Figure 8 is a perspective view of the trunnion plate that carries the mirror and refers to either of the foregoing forms of this invention.
Figure 9:
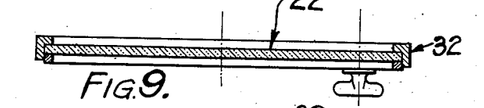
Figure 9 is a sectional view of Figure 10
Figure 10:
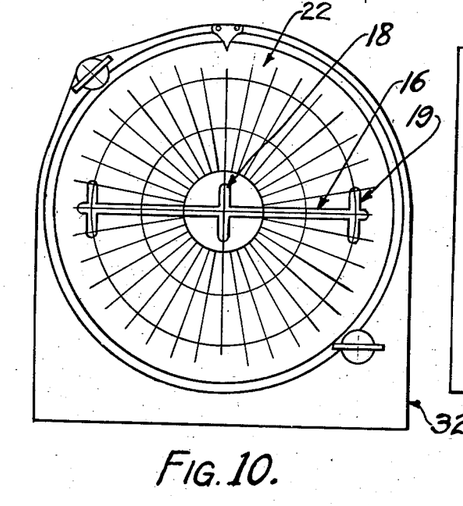
Figure 10 is an enlarged front view of the scale plate shown on Figures 6 and 7 showing the lines on the mirror as they would appear to the eye of an observer when his eye is in focus and held at the proper distance from the scale plate.

The modified form of this invention shown in Figures 6 and 7 differs in two main particulars, one being the details of the scale plate, which are illustrated in Figure 10, the other being the elimination of the three rollers fixed to the base and carrying the frame, and the substitution therefore of the ball bearing 30. This form however has the defect that the observer must move around the axis W—W as the frame 31 pivots about this axis. In some cases however this is an advantage and not the detriment that it would seem.

Figure 11:
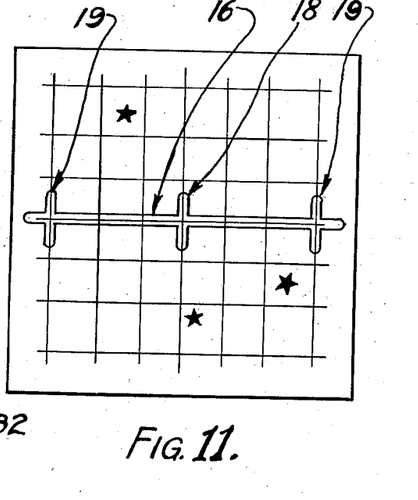
Figure 11 is diagrammatic, it shows supposed stars as reflected by the mirror, it shows the lines on the mirror as they would appear to the eye of an observer when his eye is in focus and held at the proper distance from the scale plate and it shows fixed vertical and horizontal coordinates on the scale plate of the machine.
Figure 12:
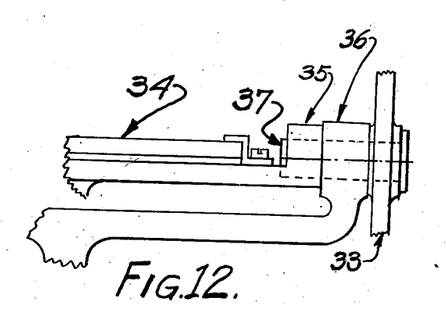
Figure 12 shows the trunnion plate for the mirror and part of the yoke upon which the plumb weight swings when the further modified form of this invention as set out in Figure 13 is used.
Figure 13:
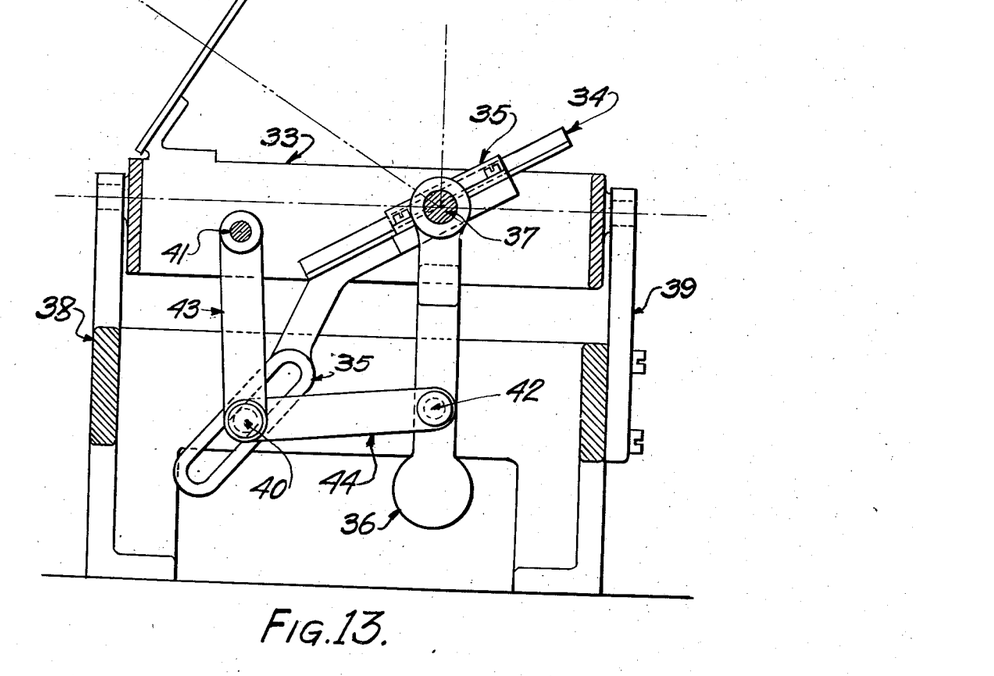
Figure 13 shows a further modified form in which the link motion performs the same functions as the gearing shown in the other forms.

In the modified form shown in Figures 12 and 13, the scale plate 32 can take the form shown in Figure 11 and is carried by the frame 33, which is pivoted in the base plate 38 and the base plate strap 39, the frame carries, pivoted on two pins 37, one at each side, the plumb-weight-yoke 36, and the mirror trunnion plate 35, which carries the mirror and has an arm extending from it slotted to receive the pin 40 which also passes through the two links 43 and 44, which are of equal length and have respective pins 41 and 42 equal distances from the pin 37 as seen in Figure 13. This arrangement gives the mirror 34 one half the angular movement of the plumb-weight-yoke 36. The friction, especially with a medium heavy oil, acts as a damper in this design to prevent swinging back and forth. A certain amount of counter balancing is necessary in all the forms described; in this last modified form it is obtained by counter balancing the allotted arm portion of the trunnion plate by making the upper part larger and heavier; in the other forms illustrated it is obtained by the counter balance segment 41 in Figure 1 and by the counter balance wheel 42 in Figure 6.

The mode of operation of this machine is simple. It indicates the zenith point and around this zenith point it affords the observer a means of determining distances and direction, so that the observer can chart and plot his latitude, longitude, and direction of flight when the time of the observation is known.

The machine functions around the axis common to the scale plate and the mirror simply by balancing around this axis. In the preferred form of construction, the eye of the observer and the zenith mark on the scale plate are also on the line of this axis. And any change in the level of the base, within limits, will not disturb this balance nor the alignment of axis, zenith mark and eye of observer, assuming that the observer and the base of the machine are in an aeroplane, and the changes in the level are those of the aeroplane. Having this balance, the adjustment of the mirror around the axis on which it turns can be made in the set of the gear on the shaft of this axis, by using an artificial zenith point, so that the reflected zenith point will coincide with the center of the scale plate when viewed in line with the horizontal line marking the axis about which the mirror turns. The gearing to the plumb weight compensating for any change of level.

In the form of construction shown in Figures 6 and 7 and in the form shown in Figure 13, the functioning of the apparatus is the same except that the eye of the observer must move for changes in the level around the axis common to the scale plate and the mirror.

In the preferred form of construction, let me consider the functions of the scale plate having polar co-ordinates as shown on Figure 5. Here we have thirty six radial lines which correspond to "Vertical circles" around the zenith ten degrees apart. The distance of the three circular co-ordinates from the center will have values depending upon the distance of the eye of the observer from the scale plate. For the purpose of explanation let me assume that the eye of the observer is held at a predetermined distance from the scale plate so that on the scale plate the distance from the center to the first circle is the tangent distance of five degrees, the second circle ten degrees and the third circle fifteen degrees. These circles represent circles of "Zenith distance". The outer circle can also be used as one marker and the lines intersecting the line of the horizontal axis of the mirror can be used as the other markers to enable the observer to obtain the predetermined distance to hold his eye. This alignment of circle on the scale plate and lines on the horizontal axis of the mirror is very clearly shown in Figure 10; in which the fine lines represent the lines on the scale plate, the double lines at 16 the line of the horizontal axis of the mirror, the double line at 18 the center of the mirror, and the double lines at 19, at each side, the markers on the mirror. The outer circle and corresponding markers being used so as to obtain as large an angle as possible at the eye of the observer to determine this distance for his eye.

Under these conditions when stars appear on the scale plate, they appear as plotted according to a system of "Vertical circles". Also the direction in which the machine is pointed is indicated on the scale plate by the vertical co-ordinate from the zenith mark towards the top of the scale plate. This for simplicity I can consider as co-inciding with the direction of flight, and so at any moment the "meridian" and "prime vertical" and direction of flight can be constantly kept under observation and comparison; and therefore the "latitude" and "longitude" can be found by reference or calculation.

One of the main advantages of this machine is the facility, speed, precision and freedom from gross errors with which the zenith point and direction of flight can be determined by comparison with charts of the stars proper for use with this machine. For quick comparison and plotting a transparent copy of the scale plate will be found very useful.

Any system of co-ordinates can be used on the scale plate and it is apparent that comparisons can be as readily made. There is however a distinct advantage for the observer, desiring to set the scale plate to a differential, to be able to rotate the scale plate in the frame 2. In Figures 4 and 5 this can be done by rotating the knob 23, which, as explained, acts as a vernier knob. The differential line would be the line which at the equator a star would follow to and over the zenith point if the direction of flight and the rate of flight of the aeroplane were constant. At other latitudes it would constantly vary and at the pole would be a circle. Rotating the scale plate also has the advantage of orientating the cardinal points to the line of flight.

This machine can be used by an observer unfamiliar with nautical astronomy by having prepared in advance of a flight a chart of the stars with the path of his zenith point marked thereon, and with notes as to the time and as to the position of the differential. He can be instructed how to determine what variations, if any, have occurred in the predetermined calculations, and how to find the position of his objective.

While I have shown and described a preferred embodiment of my invention and certain modified forms, it will be evident that various other modifications and changes may be resorted to without departing from the spirit of this invention or sacrificing any of the material advantages thereof.

What I claim is:

1. A machine for use in determining the position among the stars of the zenith point of an observer comprising a scale plate and a mirror balanced about a common axis, means for marking on the scale plate the position of the zenith point as reflected by the mirror, means for marking the center of incidence of the optical ray from the zenith point on and as reflected by the mirror to the mark on the scale plate, means for compensating for a change of level, said means turning the mirror about an axis, at right angles to the axis about which the mirror and scale plate are balanced, one half the angular change of level about this axis.

2. A machine or instrument for use in determining the latitude or longitude of an observer comprising a transparent scale plate, a mirror held in relation to the scale plate, means to preserve the level of the scale plate and the mirror around an axis common to the scale plate and the mirror, means for changing according to a predetermined ratio the level of the mirror around a horizontal axis at right angles to the common axis in accordance with the change of level of the common axis, means for obtaining the direction and distance from the scale plate proper for the eye of the observer.

3. A machine or instrument for use in determining the latitude or longitude of an observer comprising a transparent scale plate, a reflecting surface, a pivotally mounted member carrying the scale plate and the reflecting surface, means for mounting the reflecting surface in the pivotally mounted member on an axis, at right angles to the axis of the pivot of the pivotally mounted member, the latter axis being in line with the set line of the reflected zenith point between the scale plate and the reflecting surface, means for controlling by the forces of gravity the scale plate directly with the reflecting surface around the axis of the pivot of the pivotally mounted member, means for controlling by the forces of gravity the movement of the reflecting surface on its axis in the pivotally mounted member according to a set ratio of the change of level around this axis or an axis parallel thereto, means for obtaining the direction and distance from the scale plate proper for the eye of the observer.

4. A machine or instrument for use in determining the latitude or longitude of an observer comprising a transparent scale plate, held in relation to a reflecting surface in a pivotally mounted member, a reflecting surface, means for mounting the reflecting surface in the pivotally mounted member on an axis, a pivotally mounted member, around the pivot axis of which both the scale plate and the reflecting surface are directly rotatable with the change of level, means for dampening oscillations due to a change of level around this axis, means for controlling the movement of the reflecting surface around its axis in the pivotally mounted member according to a fixed ratio to preserve the point of incidence on the plane of the scale plate where the imaginary reflected image of the zenith point strikes, means for dampening oscillations due to a change of level around the axis of the reflecting surface, means for marking the point of incidence on the scale plate of the reflected image of the zenith point, means for obtaining the direction and distance proper for the eye of the observer.

5. A machine for finding the latitude or longitude or true compass direction, having a mirror carried on a horizontal axis, means for preserving the level of the horizontal axis, means for turning the mirror around the horizontal axis as the level around this axis changes according to a determined ratio, a scale plate held in front of the mirror to facilitate reading the relative distances between heavenly objects reflected by the mirror, means for marking the point of incidence where the imaginary reflected image of the zenith point strikes the scale plate in relation to the heavenly objects observed, means for focusing the scale plate in relation to the mirror.

6. A machine for use in finding latitude and longitude having in combination a scale plate, a mirror, a frame carrying the scale plate and the mirror, means for turning the mirror on a horizontal centerline parallel to the plane of the scale plate, means for preserving the level of the horizontal center line of the mirror, means for compensating for the varying change of level of the scale plate above and below the horizontal centerline of the mirror, means whereby the eye of the observer may properly gauge the correct line of centers.

7. A machine for determining the latitude or longitude or direction of an observer, comprising a mirror, pivoted about a horizontal axis, means for marking the horizontal axis and other points on the horizontal axis to enable the observer to obtain the proper focus and the point of incidence of the imaginary zenith point, a frame which holds a scale plate in proper relation to the axis of the mirror, a scale plate having markings thereon for gauging the relative position of stars observed from each other and from the imaginary zenith point, a plumb weight, means for controlling the angular movement of the mirror about its horizontal axis by the plumb weight so that the angular movement of the mirror is one half the angular movement of the plumb weight, the level of the horizontal axis of the mirror being preserved by pivoting on an axis at right angles to the horizontal axis of the mirror in a bed plate.

8. A machine for determining the latitude or longitude or direction of an observer, comprising a mirror, pivoted about a horizontal axis, means for marking the horizontal axis and having other lines to enable the observer to obtain the proper focus and the point of incidence of the imaginary zenith point, a scale plate held by a frame in proper relation to the mirror, the scale plate having lines marked to coincide with the line of the horizontal axis of the mirror and with the lines to obtain proper focus and zenith point, means for rotating the lines about the zenith point marked so as to facilitate reading direction in which the machine is pointed, a plumb weight, means for controlling the angular movement of the mirror about its horizontal axis so that this movement is one half the angular movement of the plumb weight about this axis or an axis parallel thereto, means for preserving the level of the horizontal axis of the mirror.

9. A machine, for use in determining the latitude, longitude and direction in which the machine is pointed, having, in combination a scale plate and a mirror, the scale plate having lines marked thereon readable in the dark for comparing, relative to the zenith point, the position of stars viewed by reflection through the mirror, certain lines also having a relation to the lines on the mirror so as to indicate the proper distance and line of sight for the eye of the observer, means for turning the scale plate so as to indicate the direction in which the machine is pointed, a frame carrying the scale plate and the mirror and mounted on an axis passing through the indicated zenith point on the scale plate, the mirror being carried on trunnions whose axis passes across the reflecting plane of the mirror and intersects the axis passing through the indicated zenith point on the scale plate, a plumb weight preserving the level of the horizontal trunnion axis of the mirror and the scale plate around the axis passing through the indicated zenith point, and controlling the angular movement of the mirror about its trunnion axis so that the angular movement of the mirror is one half the movement of the plumb weight, means for marking the trunnion axis of the mirror and certain other lines readable in the dark when viewed in connection with the scale plate and the lines thereon, a gyroscope moving with the plumb weight and preventing oscillations due to sudden changes of level.

10. A machine for use in determining the position among the stars of the zenith point of an observer and the direction in which the machine is pointed comprising a scale plate and a mirror balanced about a common axis, means for stabilizing this balance, means for visibly marking on the scale plate the position of the zenith point as reflected by the mirror, means for marking visible lines on the scale plate corresponding to a system of vertical circles and zenith distances about the zenith point, means for turning the scale plate with the marked vertical circles by a vernier movement for orientation and indicating the differential, means for visibly marking the center of incidence of the optical ray from the zenith point on and as reflected by the mirror on the line of its axis to the mark on the scale plate, means for visibly marking on the horizontal center line of the mirror passing through the center of incidence of the optical ray from the zenith point other marks for use in connection with marks on the scale plate to determine the proper distance for the eye of an observer from the scale plate, means for compensating for a change of level, said means turning the mirror about an axis, at right angles to the axis about which the mirror and scale plate are balanced, one half the angular change of level about this axis, that is about the axis on which the mirror turns.

In testimony whereof I affix my signature.

GEORGE M. HAYES.